UNITED STATES PATENT OFFICE.

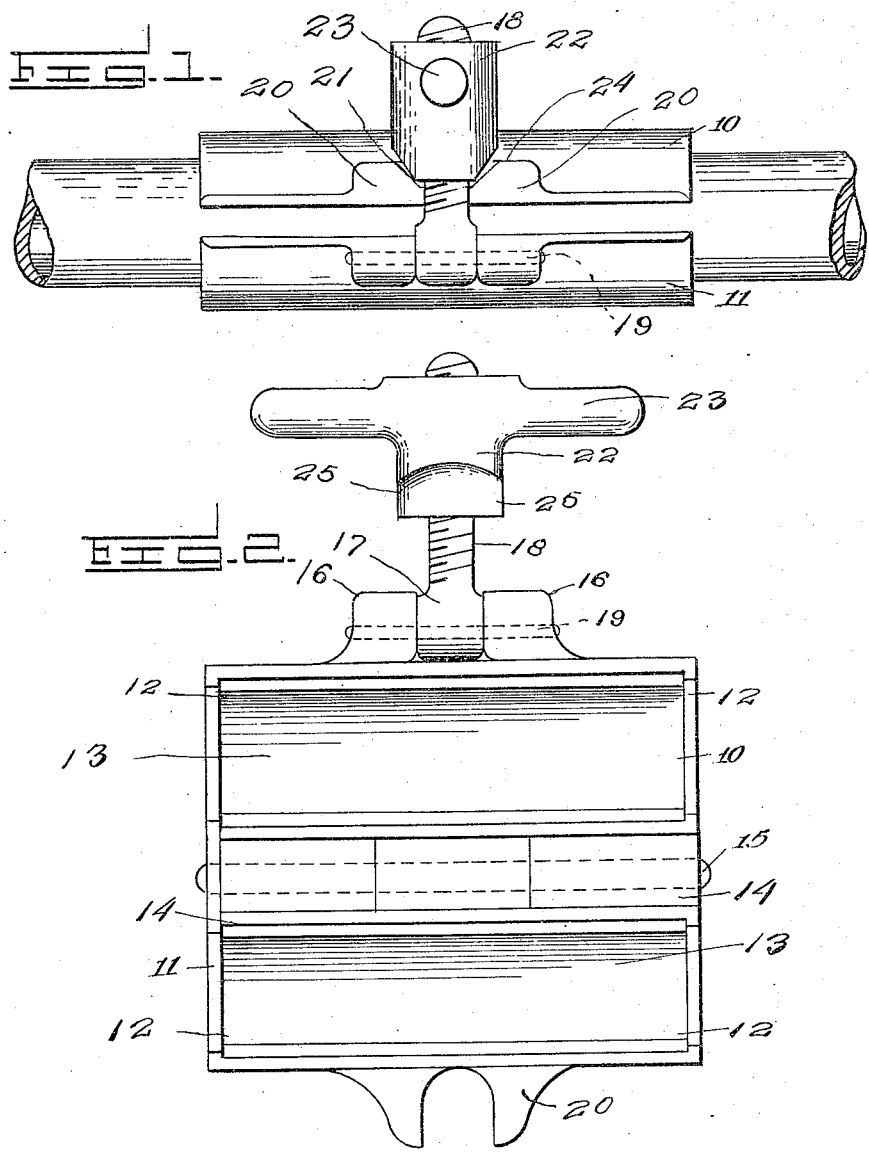

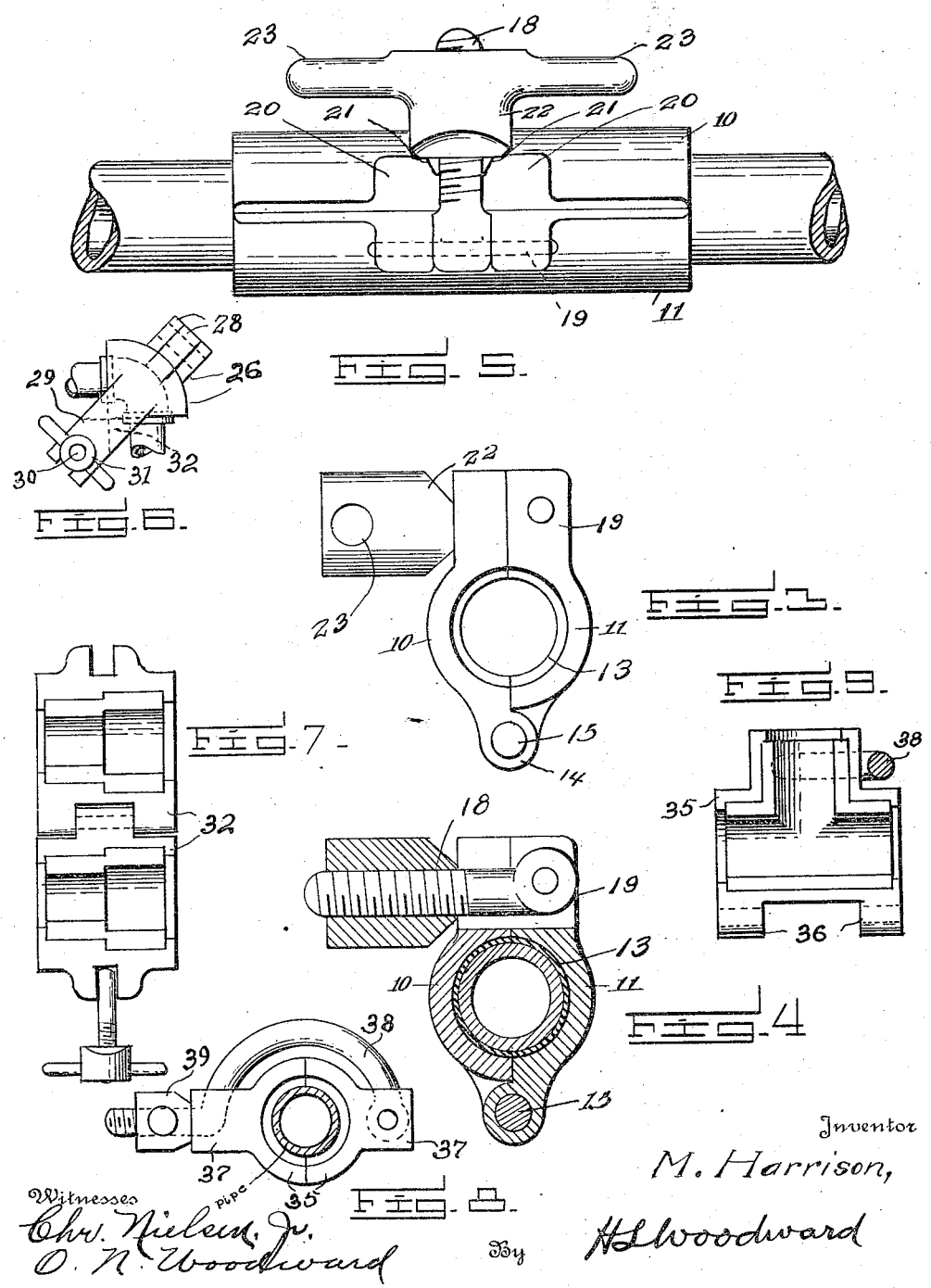

MORRIS HARRISON, OF NEW YORK, N. Y.

EMERGENCY LEAK-STOPPER.

1,191,000.  Specification of Letters Patent.  Patented July 11, 1916.

Application filed June 12, 1914. Serial No. 844,735.

*To all whom it may concern:*

Be it known that I, MORRIS HARRISON, a citizen of the United States, residing at New York, in the county of Kings and State of New York, have invented new and useful Improvements in Emergency Leak-Stoppers, of which the following is a specification.

The invention has for an object to effect an improvement in pipe clamps of that type where two hinged members are shaped to coengage on opposite sides of a pipe, with means to clamp them upon the pipe over a burst to prevent escape of water and other fluid under pressure.

It is an important object to give the device a wide range of adjustability to accommodate iron or lead pipes of different sizes and at the same time to enable its quick application, whereby in the repair of a pipe the user will be exposed in a minimum degree to escaping fluid, and damages to goods will be minimized.

It is a further important object to attain the two last named advantages with means of a simple nature which will not be difficult to manufacture and may be produced largely with standard machinery.

Additional objects, advantages and features of invention will appear, some of which will be apparent from the following description, and from the drawings, in which, Figure 1 is a side view of the device. Fig. 2 is a view thereof in open position. Fig. 3 is an end view of the device closed. Fig. 4 is a cross section thereof, Fig. 5 is a front view of the device adjusted upon a pipe before the clamp is turned. Fig. 6 is a top view of the device constructed for use on elbows. Fig. 7 is a view of the device shaped for use on reducers. Figs. 8 and 9 show the outer end of the stem, and the inner side of one section of a further form of the device for use on T's.

There is illustrated a clamp formed in two hinged sections 10 and 11, semi-circular in cross section, their inner faces being recessed as at 12, and having secured therein a suitable resilient material 13, rubber being used with very good results. The sections have integral hinge ears 14, through which there is engaged a pintle 15. The section 11 has on its forward side two ears 16, between which there is pivotally secured the head 17 of a swinging screw 18, by means of a pintle 19 coengaged through the ears and head. The opposite section 10 has on its forward edge two cam lugs 20, adapted to register with the ears 16 when the clamp is closed, the space 21 therebetween being just sufficient to receive the screw 18 under lateral oscillation. Engaged upon the screw there is a cam head 22, having a threaded passage therethrough engaged upon the screw, and provided with the grip arms 23 projecting radially therefrom. The inner sides of the lugs 20 are beveled slightly and have on their outer sides suitable bearing surfaces 24 within the radius of the head 22. On its inner side the head is formed with oppositely inclined cam faces 25 meeting on a diametrical line, whereby, when the head is adjusted upon the screw 18 so as to engage snugly between the lugs 20 a quarter turn of the head will cause a rapid compression of the sections 10 and 11 toward each other, both by the inward movement of the head upon the screw and the riding of the cam surfaces 25 upon the lugs 20. In order to enable a snug fit of the cam head initially between the lugs 20 the bevels thereon may be deeper toward their outer ends, whereby a slight wedging action may be attained by the forcing of the cam head inwardly therebetween.

The clamp may be made of any desirable length, in practice being from four to six inches in length, although they may be made longer or shorter without detriment. The arc of the inner surface of the material 13 should correspond to that of the smallest, or nearly the smallest pipe upon which the clamp is to be used. By having the material 13 project sufficiently from the recesses 12 the device may be made to accommodate itself readily to the curvature of various diameters of pipes.

In use, a pipe having a leak therein and requiring to be temporarily repaired, if fluid is escaping rapidly therefrom the device is adjusted upon the pipe at a point spaced from the burst with the cam head arranged to just engage with a slight wedging action between the lugs 20. The screw 18 is then swung outwardly to release the device and it is slipped over the break with one of the sections extending as nearly as possible equal distances on each side of the break longitudinally and circumferentially of the pipe. A quick inward movement of the cam head in the proper position and a quarter turn thereof will produce the necessary pressure for ordinary repairs. In order that the device may operate with maximum efficiency and convenience it is desirable to have the grip arms 23 coincide in direction with the cam faces 25. The arms will then be parallel to the pipe when the device is fully clamped.

The clamp is well adapted for application to elbows, T's, and reducers, by forming the hinged members in the proper forms.

In Fig. 6 the device is shown constructed for application to an elbow, the hinged members 25 being formed with a curved passage therethrough when closed, in which is fitted a rubber or like cushion of corresponding form. From the convex portions of the members 26 the hinge knuckles 28 are extended, while from their inner sides there are extended the lugs 29, between those on one side the screw 30 being pivoted, provided with the cam head 31, similar to the one before described. The outer sides of the lugs are recessed concentrically with the passage through the device, as indicated at 32.

In Fig. 7 the construction suitable for a reducer connection is shown, the hinged members 32' having larger recesses therein at one end than at the other, the construction otherwise being the same as that first described.

Figs. 8 and 9 illustrate the construction of a T form. Here, each of the sections 35 are formed in the shape of a T, and adapted to each engage half around the head and stem of a T. The sections are provided with the hinge knuckles 36 at the outer side of the head portions, and in order that one screw and cam device may be used to clamp the device securely in place, the stem portions are provided with central laterally extending lugs 37, longitudinally spaced and in a plane at right angles to the plane on which the sections meet. Pivoted between the lugs of one section there is gooseneck 38 adapted to swing into position with its outer end between the diametrically opposite lugs of the other section, its intermediate portion being of such form as to permit it to lie spaced well from the intervening material of the device when in clamped position. The outer end of the goose neck is extended radially a short distance, and threaded, the cam head 39 being engaged therewith, so that when the threaded portion is forced between the lugs, the head 39 may function as in the first described form of the device.

What is claimed:

1. The combination of two relatively movable elements, a screw member pivoted on one, spaced lugs on the other to receive the screw therebetween, and a cam head threaded upon the screw, circular in cross section, of a diameter greater than the distance between the lugs and having a convex inner end including oppositely inclined cam faces constructed and adapted to be received with the screw between the lugs and to ride upon the lugs when the head is rotated, as described.

2. In a device of the class described two opposed relatively movable clamping members, means to draw the members together including a screw pivoted on one for movement into proximity with the other at times, two lugs spaced to receive the screw therebetween and having opposed faces divergent toward the end of the screw when the latter is between the lugs, a cam head threaded on the screw having similarly inclined cam faces forming a convex end adapted to engage snugly between the divergent faces of the lugs when the screw is between the lugs, and means to rotate the head.

In testimony whereof I have hereunto set my hand in presence of two subscribing witnesses.

MORRIS HARRISON.

Witnesses:
 GEORGE SMITH,
 C. Q. WALSH.

Copies of this patent may be obtained for five cents each, by addressing the "Commissioner of Patents, Washington, D. C."